(12) United States Patent
Masuda et al.

(10) Patent No.: US 6,393,684 B2
(45) Date of Patent: May 28, 2002

(54) RUBBER PLUG FITTING APPARATUS

(75) Inventors: Yoshimi Masuda; Yoshiaki Nomoto, both of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/816,176

(22) Filed: Mar. 26, 2001

(30) Foreign Application Priority Data

Mar. 28, 2000 (JP) ........................................ 2000-089898

(51) Int. Cl.[7] ................................................. D02J 3/14
(52) U.S. Cl. ............................. 29/235; 29/450; 29/754
(58) Field of Search ......................... 29/235, 857, 450, 29/754; 269/284

(56) References Cited

U.S. PATENT DOCUMENTS

| | | | | | |
|---|---|---|---|---|---|
| 4,159,161 | A | * | 6/1979 | Timmer .................. | 339/264 R |
| 4,653,182 | A | * | 3/1987 | Fukuda ........................ | 29/754 |
| 5,351,385 | A | * | 10/1994 | Takano ........................ | 29/450 |
| 5,432,996 | A | * | 7/1995 | Imgrut ........................ | 29/754 |
| 5,743,002 | A | * | 4/1998 | Ito et al. ........................ | 29/754 |
| 5,926,947 | A | * | 7/1999 | Takano et al. ................. | 29/754 |
| 6,134,769 | A | * | 10/2000 | Takano et al. ................. | 29/450 |
| 6,241,261 | B1 | * | 6/2001 | Rehm ......................... | 279/124 |

FOREIGN PATENT DOCUMENTS

JP          9-260008          10/1997

* cited by examiner

Primary Examiner—Joseph J. Hail, III
Assistant Examiner—Daniel Shanley
(74) Attorney, Agent, or Firm—Finnegan, Henderson, Farabow, Garrett & Dunner, L.L.P.

(57) ABSTRACT

An upper and a lower rubber plug holders are provided with fixed arms to be inserted and held in upper and lower fixed blocks, and operatively pushed parts at ends of the fixed arms. The upper and lower fixed blocks are provided with slots in which the fixed arms are inserted and held and from which the operatively pushed parts are protruded on the side opposite to the insertion side. The slots are provided with balls and coil springs which fix the fixed arms inserted into the slots by the insertion of the fixed arms into the slots and allow the fixed arms to be pulled out of the slots by a push of the operatively pushed parts. This structure shortens time to change the parts and ensures easy and positive change of the parts.

4 Claims, 9 Drawing Sheets

FIG.1
RRIOR ART

FIG.9B

RUBBER PLUG FITTING APPARATUS

BACKGROUND OF THE INVENTION

1. Field of the Invention

This invention relates to a rubber plug fitting apparatus for fitting a rubber plug over a wire end.

2. Description of the Related Art

A known conventional rubber plug fitting apparatus is disclosed in a Japanese Patent Application, Laid-Open Publication No. Hei-9-260008. This rubber plug fitting apparatus has a rubber plug supply section, a rubber plug receiving section and a rubber plug fitting section. The rubber plug supply section serves to align rubber plugs to sequentially feed them to the rubber plug receiving section. The rubber plug receiving section serves to transport the rubber plugs supplied from the rubber plug supply section to the rubber plug fitting section. The rubber plug fitting section holds a rubber plug with an opposed rubber plug holder pair and brings the rubber plug close to a wire end held separately to fit the rubber plug over the wire end.

Figure 1:
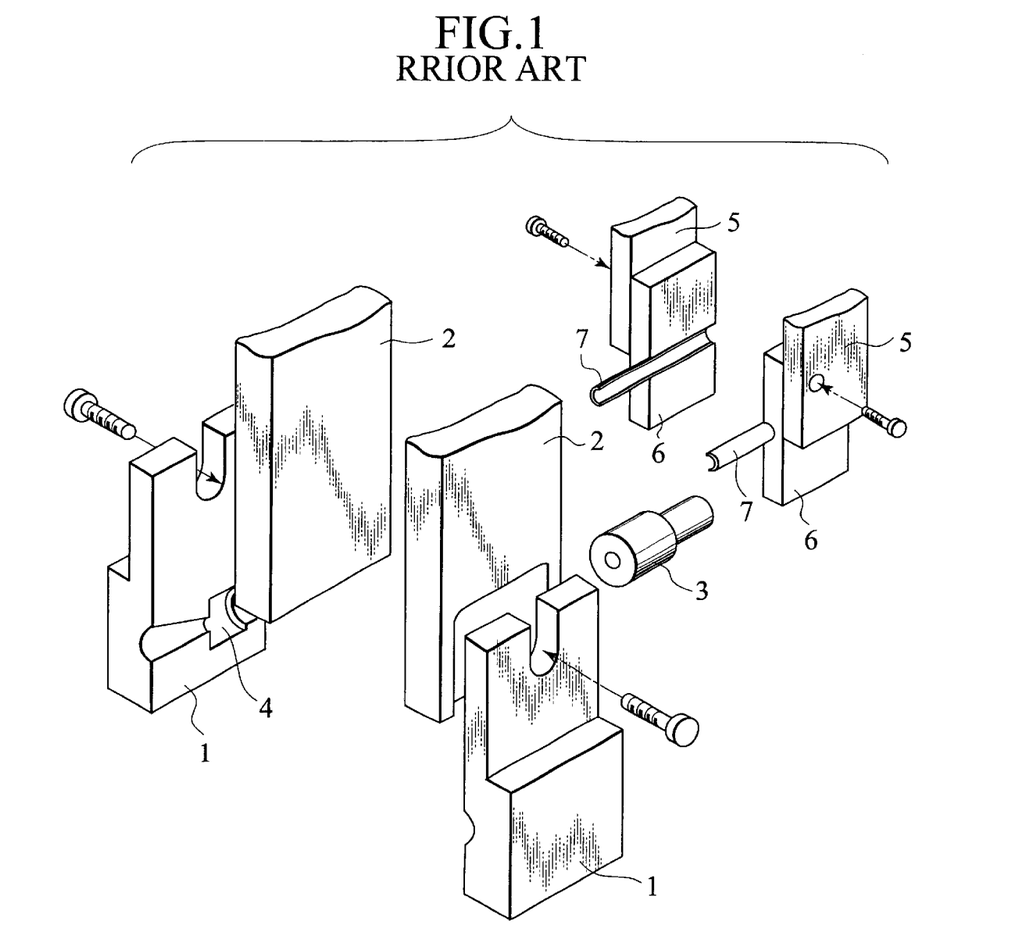
FIG. 1 is an exploded perspective view of a conventional rubber plug fitting section.

As shown in FIG. 1, the rubber plug fitting section has a pair of rubber plug holders 1, 1 each screwed to supporting blocks 2, 2. The rubber plug holders 1, 1 each have recesses 4, 4 in the opposed surfaces for accommodating a rubber plug. The rubber plug fitting section also has a pair of insertion guides 6, 6 screwed to a pair of insertion guide supporting blocks 5, 5 as shown in FIG. 1. The insertion guides 6, 6 have insertion pipe halves 7, 7 in a protruding manner, a pipe being divided along the central axis thereof. The insertion pipe halves 7, 7 are joined to constitute a pipe to be inserted into a tubular hole of a rubber plug 3.

The insertion guide supporting blocks 5, 5 are provided to be movable with respect to the holder supporting blocks 2, 2 so as to insert the insertion pipe halves 7, 7 into the tubular hole of the rubber plug 3 held between the rubber plug holders 1, 1. The pipe formed with the joined insertion pipe halves 7, 7 serves to secure a wire insertion space in the rubber plug 3. In this rubber plug fitting apparatus, the rubber plug holders 1, 1 and the insertion guides 6, 6 are changed in accordance with a kind or size of the rubber plug to be fitted, thereby to handle various kinds of rubber plugs.

However, in the above conventional rubber plug fitting apparatus, the rubber plug holders 1, 1 are screwed to the holder supporting blocks 2, 2 and the insertion guides 6, 6 are screwed to the insertion guide supporting blocks 5, 5, which arrangement requires much time to change the parts and skills of adjusting the degree of screwing or the like. Thus every time the size or kind of the rubber plug 3 is changed, the operation of the apparatus is entirely suspended for a long time, which prevents reduction in cost of fitting rubber plugs.

SUMMARY OF THE INVENTION

This invention has been achieved with such points in mind.

It is therefore an object of the invention to provide a rubber plug fitting apparatus which takes short time to change parts and provide easy and positive change of the parts.

According to a first aspect of the invention, there is provided a rubber plug fitting apparatus which comprises a rubber plug holder for holding a rubber plug to be fitted over a wire end, and a holder supporting block to which the rubber plug holder is detachably attached, the rubber plug holder comprising a fixed arm configured to be inserted and fixed into the holder supporting block, and an operatively pushed part formed at an end of the fixed arm, and the holder supporting block comprising a slot into which the fixed arm is inserted and fitted and from which the operatively pushed part is protruded on the side opposite to the insertion side, and a fixing means for fixing the fixed arm inserted and fitted into the slot with the insertion of the fixed arm into the slot, and allowing the fixed arm to be pulled out of the slot at a press of the operatively pushed part.

Thus in this invention, the operatively pushed part and the fixed arm of the rubber plug holder are inserted into the holder supporting block to fix the fixed arm into the holder supporting block. At that time, the operatively pushed part is protruded from the slot of the holder supporting block on the side opposite to the insertion side. The fixing means fixing the fixed arm to the holder supporting block is set to allow the fixed arm to be pulled out of the slot by a push of the operatively pushed part protruded from the side opposite to the insertion side of the slot.

Thus in this structure, in order to detach the rubber plug holder from the holder supporting block, the operatively pushed part is pushed instead of pulling out the rubber plug holder, which improves the workability. More specifically, if the part of the rubber plug holder positioned on the insertion side of the holder supporting block is gripped to be pulled out, the rubber plug holder should be held on both sides, which provides low workability. In this structure, only a push of the operatively pushed part can easily detach the rubber plug holder from the holder supporting block.

According to a second aspect of the invention, the fixing means comprises a ball provided in an internal wall of the slot and arranged to be engaged with the fixed arm inserted and fitted into the slot, and a biasing means for biasing the ball to the slot side to engage the ball with the fixed arm inserted and fitted into the slot.

Thus in this invention, the ball provided in the internal wall of the slot of the holder supporting block presses the fixed arm with the biasing means, thereby to fix the rubber plug holder to the holder supporting block positively, providing a tactile feel. Thus the attachment/detachment of the rubber plug holder to/from the holder supporting block is easily performed.

More specifically, when the fixed arm of the rubber plug holder is inserted in the slot, the fixed arm of the rubber plug holder is pushed against the pressing force of the ball by confirming a click touch or a click feeling, thereby being pressed and fixed by the ball. On the other hand, when the fixed arm being removed, the operatively pushed part is pushed against the biasing force of the ball to push the ball up, thereby to detach the rubber plug holder easily.

According to a third aspect of the invention, the fixed arm is provided with a recess with which the ball is engaged.

According to a fourth aspect of the invention, the recess is a V-shaped groove.

Thus in this invention, the engagement of the ball with the recess formed in the fixed arm inserted into the slot fixes the rubber plug holder, and the disengagement of the ball with the recess by a push of the operatively pushed part removes the rubber plug holder. The so-called plunger mechanism provides speedy and positive attachment/detachment of the rubber plug holder, eliminating a cumbersome task such as screwing, and requiring no special skills.

BRIEF DESCRIPTION OF THE ACCOMPANYING DRAWINGS

The above and further objects and novel features of the invention will more fully appear from the following detailed description when the same is read in conjunction with the accompanying drawings, in which.

DETAILED DESCRIPTION OF THE PREFERRED EMBODIMENT

With reference to the accompanying drawings, a preferred embodiment of this invention will now be described.

Figure 2:
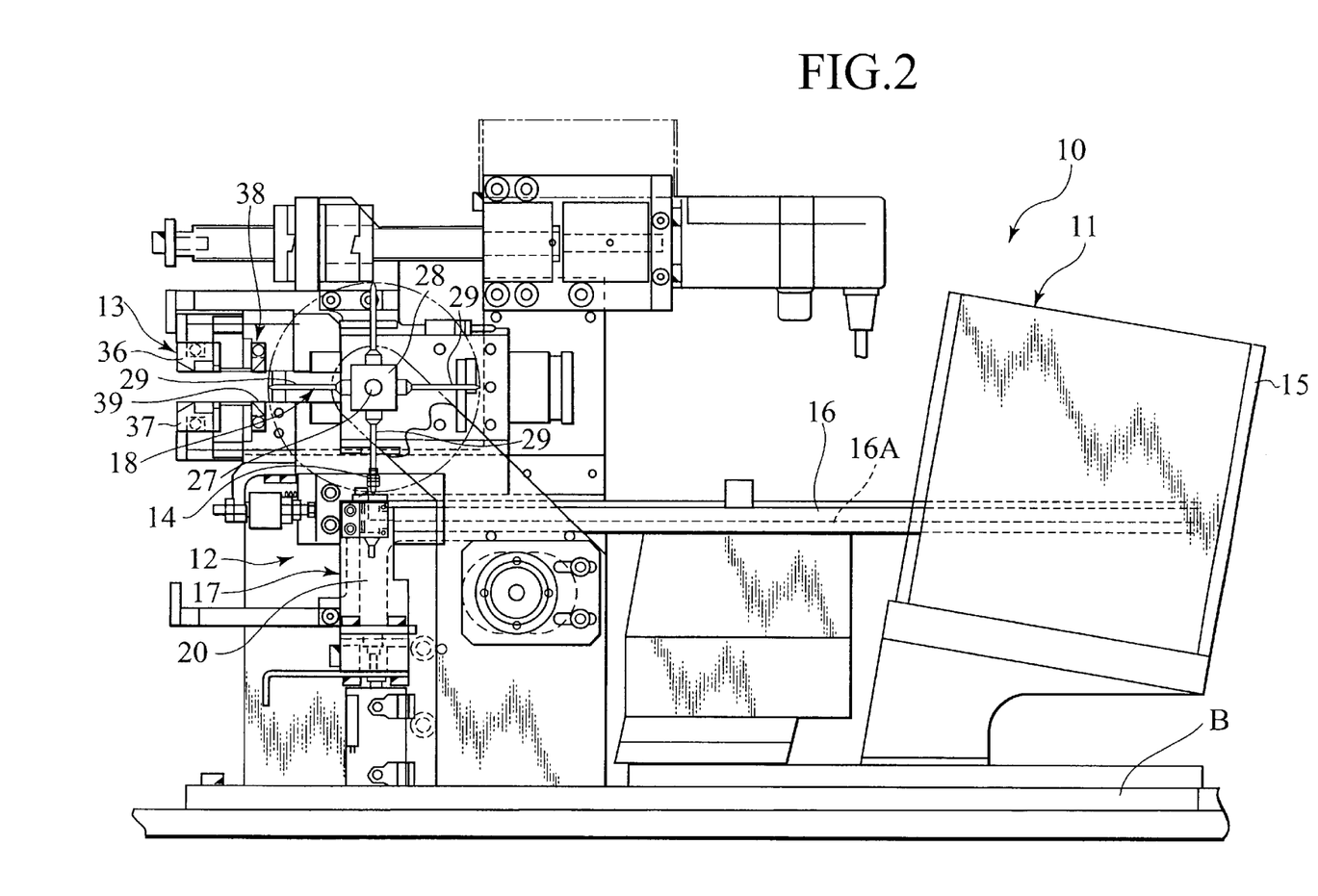
FIG. 2 is a front view of a rubber plug fitting apparatus according to an embodiment of this invention.
Figure 3:
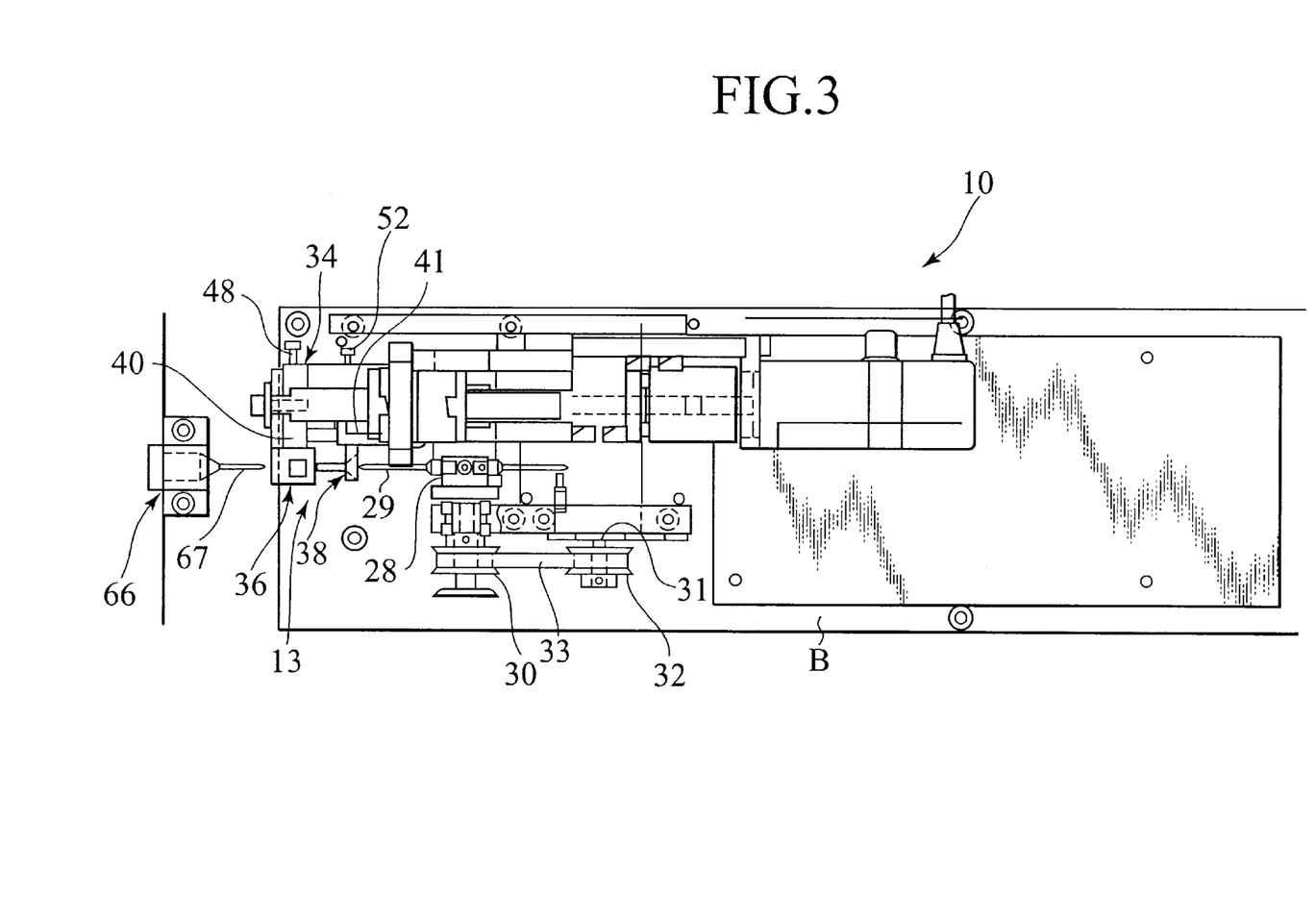
FIG. 3 is a plan view of the rubber plug fitting apparatus in this embodiment.

As shown in FIGS. 2 and 3, a rubber plug fitting apparatus 10 consists generally of a rubber plug supply section 11, a rubber plug transfer section 12 and a rubber plug fitting section 13 all of which are provided on a substrate B.

Rubber Plug Supply Section

The rubber plug supply section has a drum 15 for accommodating a plurality of rubber plugs 14 and a feeder 16 for aligning in a row the rubber plugs 14 supplied from the drum 15 to feed them to the rubber plug transfer section 12. In the rubber plug supply section 11, the drum 15 is rotationally moved to drop the rubber plugs 14 in the drum 15 into an alignment groove 16A of the feeder 16, thereby to push the rubber plugs 14 sequentially into the rubber plug transfer section 12.

Rubber Plug Transfer Section

Figure 4:
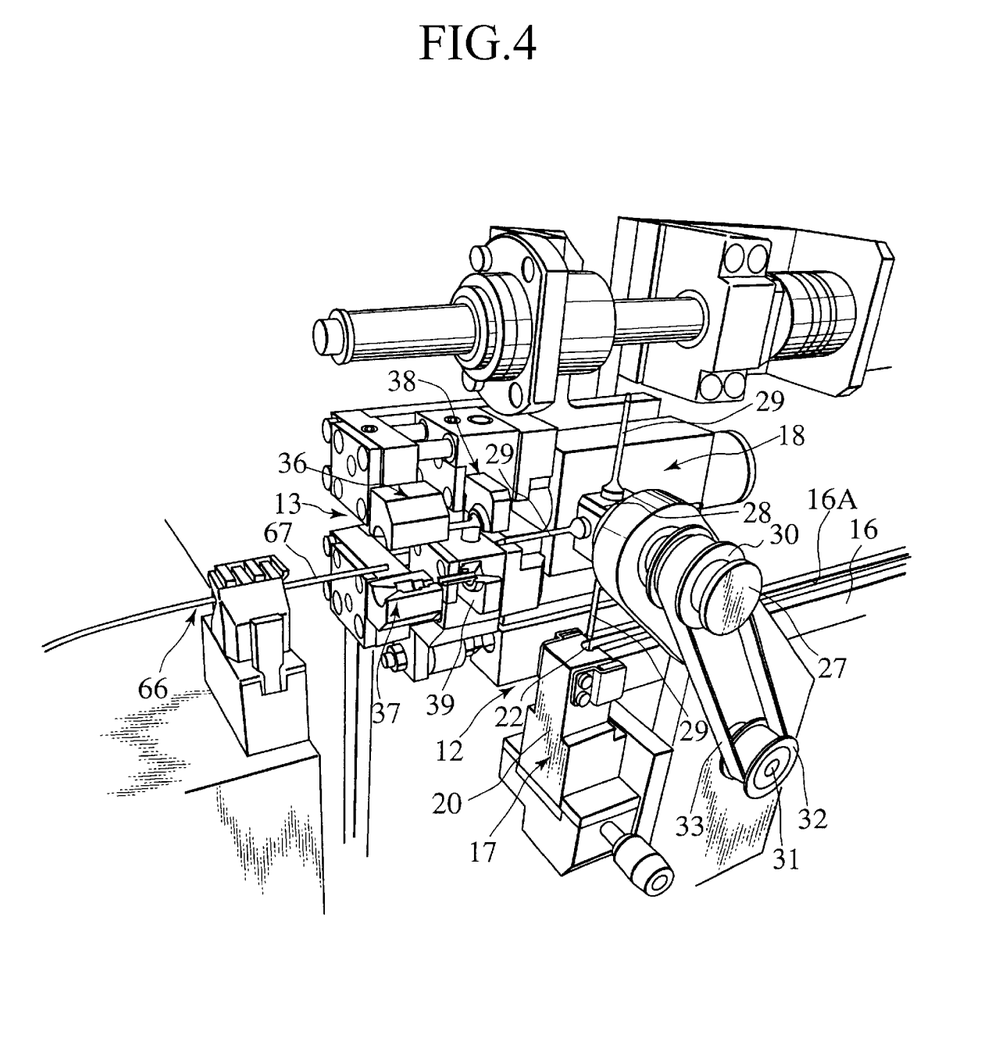
FIG. 4 is a perspective view of a rubber plug transfer section in this embodiment.

As shown in FIG. 4, the rubber plug transfer section 12 has a rubber plug pusher 17 arranged at an end of the feeder 16 (the end positioned on the downstream side of the flow of the rubber plugs 14) and a rotary transporter 18 disposed above the rubber plug pusher 17.

Figure 5A:
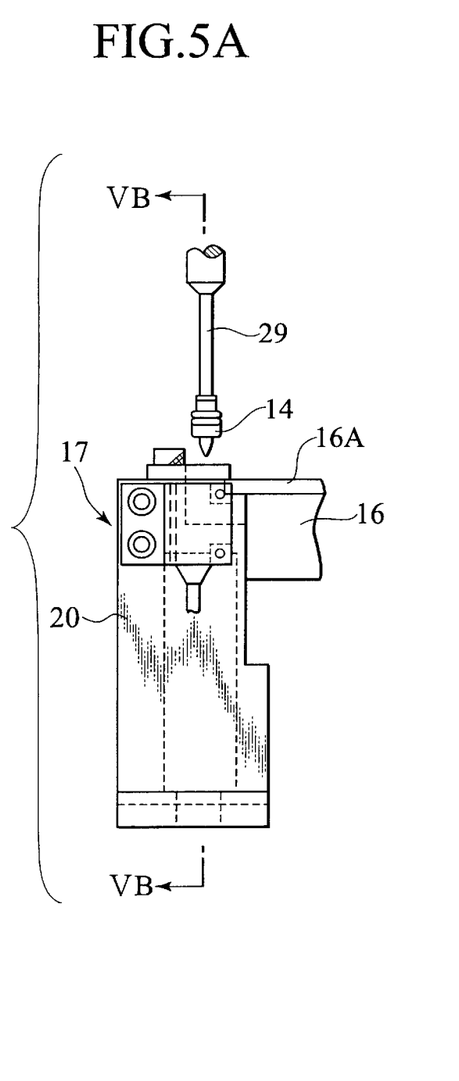
FIG. 5A is a front view showing a main part of a rubber plug pusher in this embodiment.
Figure 5B:
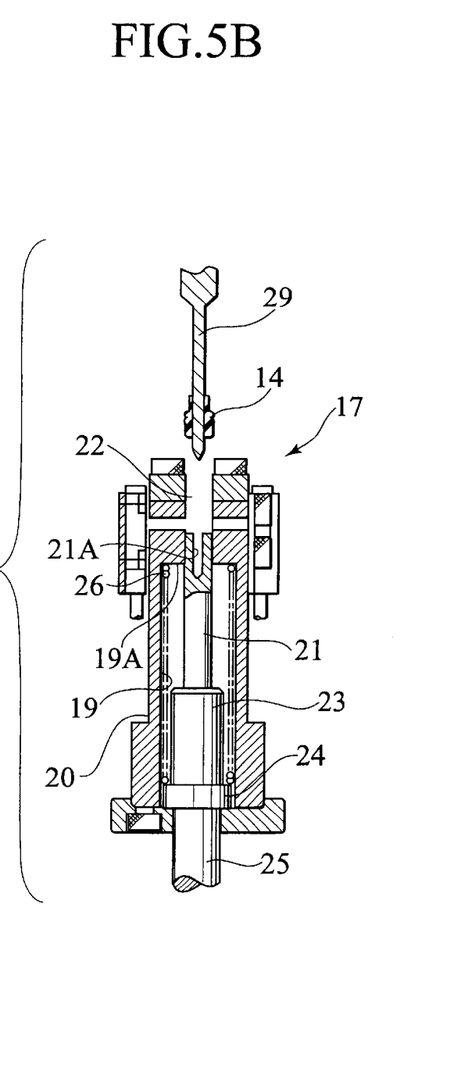
FIG. 5B is a sectional view taken along line VB—VB in FIG. 5A.

Now the structure of the rubber plug pusher 17 will be described with reference to the drawings. As shown in FIG. 5B, the rubber plug pusher 17 has an escape base 20 with a pin insertion space 19 penetrating inside in the vertical direction, an escape pin 21 fitted movably in the vertical direction in the pin insertion space 19 and a rubber plug holder 22 formed in the upper part of the pin insertion space 19.

The rubber plug holder 22 is a space communicated with the alignment groove 16A of the feeder 16. A rubber plug 14 reaching the holder 22 is pushed by the escape pin 21 to the rotary transporter 18. The escape pin 21 has at its front end a transporting pin insertion recess 21A as shown in FIG. 5B.

At the bottom of the escape pin 21 integrally formed is a large-diameter part 23 which is movable up and down in the pin insertion space 19 while defining the stroke of up and down movement of the escape pin 21. At the bottom of the large-diameter part 23 integrally formed is a flange 24 with a diameter larger than that of the large-diameter part 23, which flange is movable up and down with the large-diameter part 23 in the pin insertion space 19.

At the bottom of the flange 24 integrally formed is a piston rod 25 extended downwardly therefrom. The lower part of the piston rod 25 is introduced into a jig cylinder not shown and driven to move up and down with the cylinder.

On the flange 24, a coil spring 26 is arranged in a compressed state to surround the large-diameter part 23 and the escape pin 21. The upper end of the coil spring 26 abuts against an upper end 19A of the pin insertion space 19. Thus the flange 24 is biased downwardly with the coil spring 26.

Now the structure of the rotary transporter 18 constituting the rubber plug transfer section 12 with the rubber plug pusher 17 will be described with reference to the drawings.

Figure 6A:
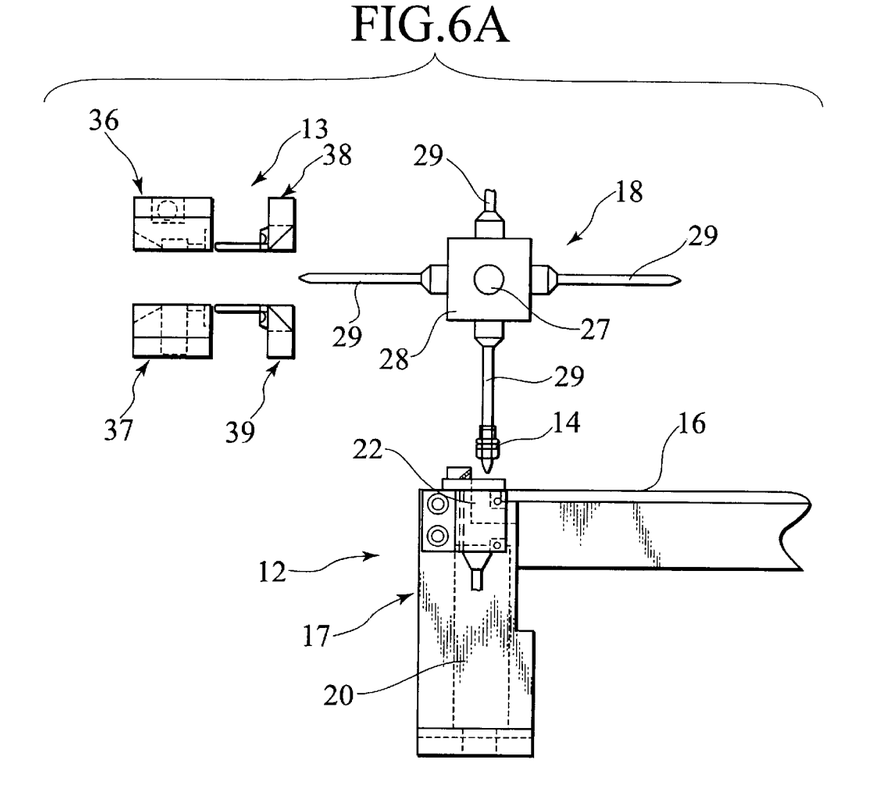
FIG. 6A is a front view showing a positional relationship between the rubber plug transfer section and a rubber plug fitting section in this embodiment.
Figure 6B:
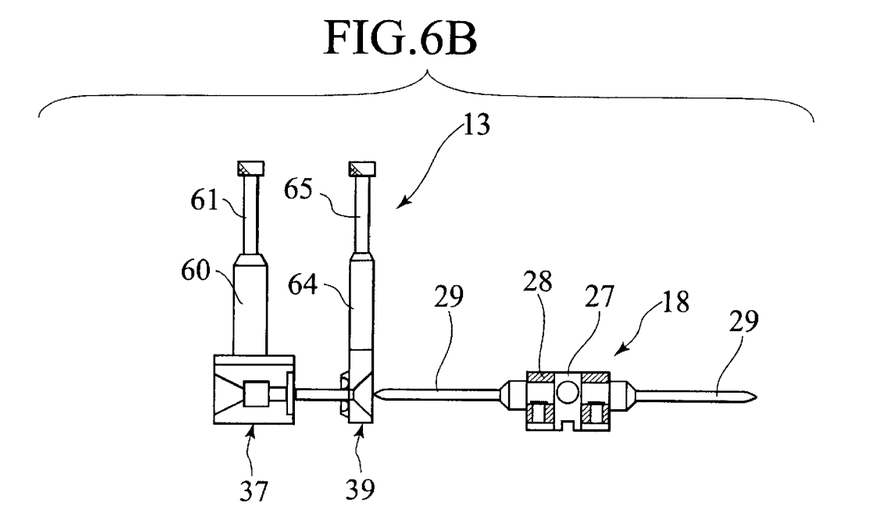
FIG. 6B is a plan view of FIG. 6A.

As shown in FIGS. 6A and 6B, the rotary transporter 18 has a rotating shaft 27 arranged above the rubber plug pusher 17 along the horizontal direction, a rotation block 28 fixed to the rotating shaft 27 and four transporting pins 29 fixed around the rotation block 28 to form the right angle with the adjoining pins.

As shown in FIG. 4, the rotating shaft 27 is extended laterally to support thereon a transmission pulley 30 for receiving the transmission of a rotational driving force. Further, as shown in the same figure, a driving shaft 31 is arranged in parallel with the rotating shaft 27 at the lower part of the apparatus. The driving shaft 31 rotatably supports a drive pulley 32 thereon. On the transmission pulley 30 and the drive pulley 32, an endless belt 33 is wound. The driving shaft 31 is set to rotate so as to rotate the rotating shaft 27, 90 degrees at a time. The rotational timing depends on the movement in the rubber plug fitting section 13 described later. The rotational direction of the transporting pins 29 is a clock-wise direction in FIG. 2. The transporting pin 29 receiving the rubber plug 14 from the rubber plug pusher 17 rotates 90 degrees to supply the rubber plug 14 to the rubber plug fitting section 13 described later.

Rubber Plug Fitting Section

Now with reference to FIGS. 7 to 9B, the structure of the rubber plug fitting section 13 will be described. The rubber plug fitting section 13 in this embodiment has an upper holder supporting block 34 and a lower holder supporting block 35 used in a pair, which blocks 34 and 35 are provided on the apparatus body side and movable in both the vertical and fitting transverse directions, and an upper rubber plug holder 36, a lower rubber plug holder 37, an upper insertion guide 38, and a lower insertion guide 39, which holders and guides being fitted and fixed to the upper and lower holder supporting blocks 34 and 35, respectively.

Figure 7:
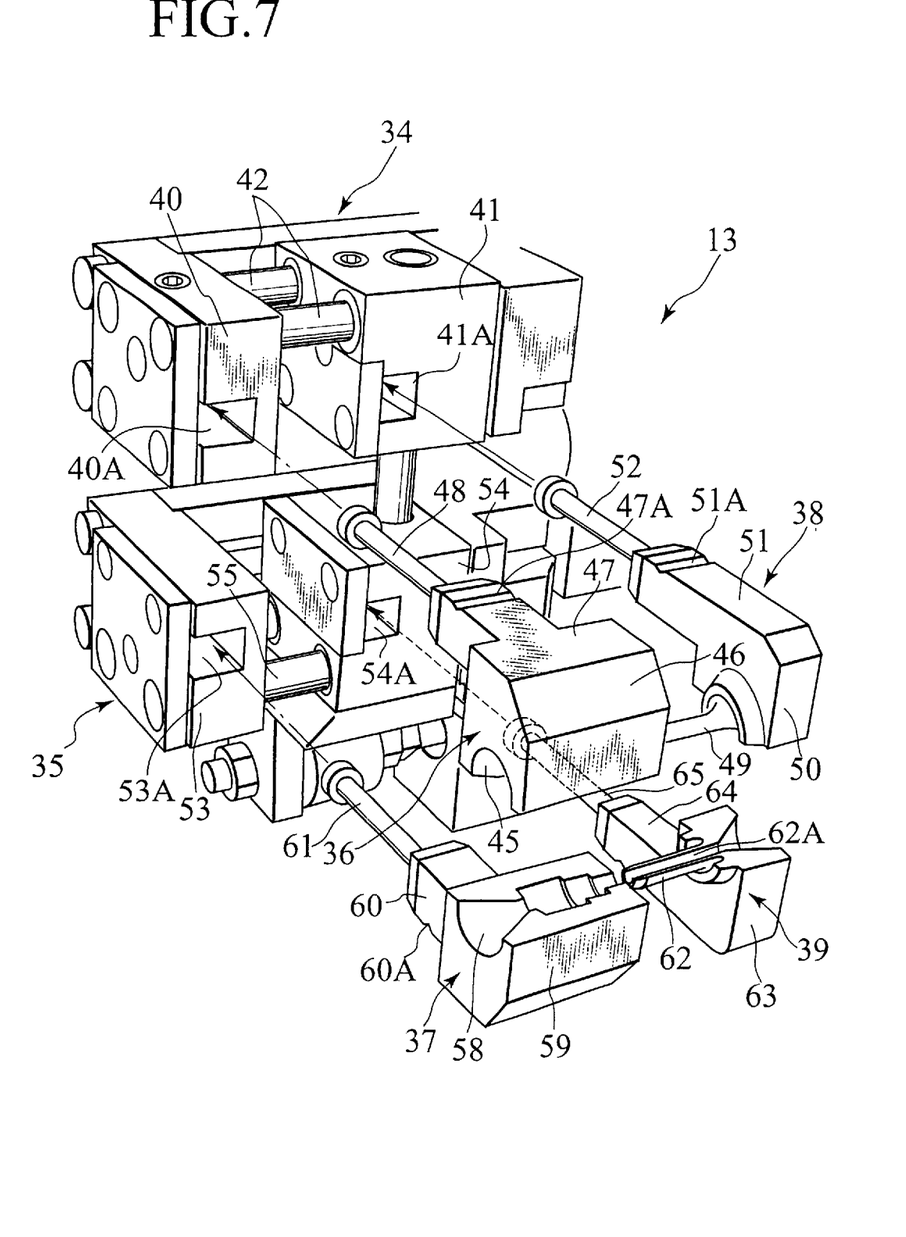
FIG. 7 is an exploded perspective view of the rubber plug fitting section in this embodiment.

As shown in FIG. 7, the upper holder supporting block 34 has an upper fixed block 40 to which the upper rubber plug holder 36 is attached and an upper movable block 41 positioned closer to the rotary transporter 18 than the upper fixed block 40.

The upper fixed block 40 has a slot 40A penetrating along the apparatus-width direction. The upper movable block 41 also has a slot 41A penetrating in the same direction. The upper movable block 41 is arranged to reciprocatingly slide on guide rods 42, 42 laid across the opposed surfaces of the upper fixed block 40 and the upper holder supporting block 34. The upper movable block 41 is driven with a drive means not shown to move reciprocatingly along the guide rods 42, 42 in a prescribed timing.

Figure 9A:
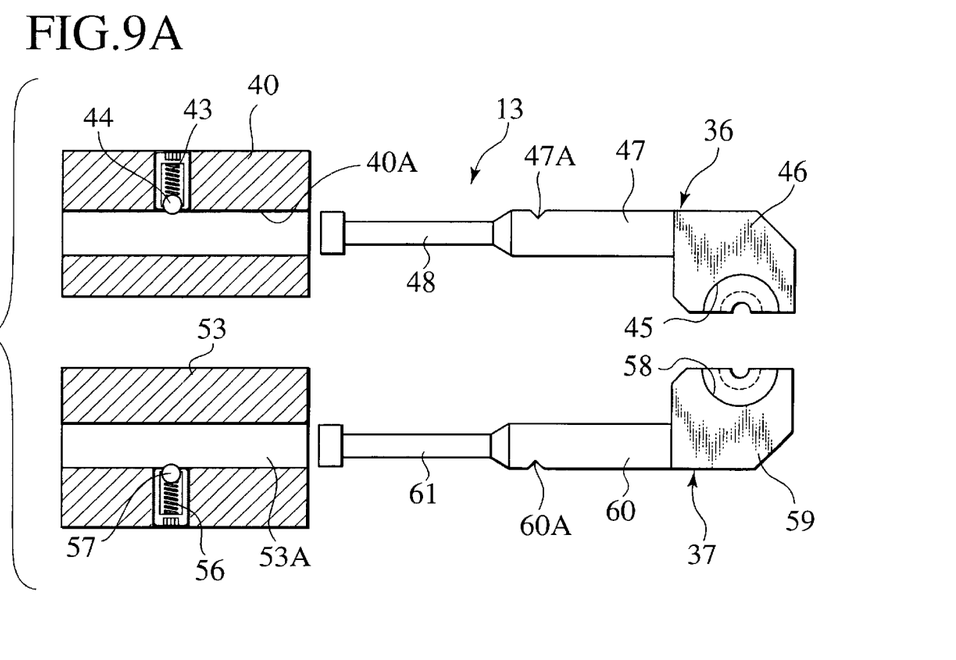
FIG. 9A is a section-in-part explanatory view showing the rubber plug fitting section before assemblage in this embodiment.

As shown in FIG. 9A, the slot 40A has an internal wall in which provided is a ball 44 that is biased with a coil spring 43 as a biasing means to be protruded but not pushed out into the slot 40A. In short, the spring coil 43 and the boll 44 constitute a so-called ball plunger. Such a ball plunger is, not shown in the figure, provided in the slot 41A of the upper movable block 41 in the same manner.

Figure 9B:
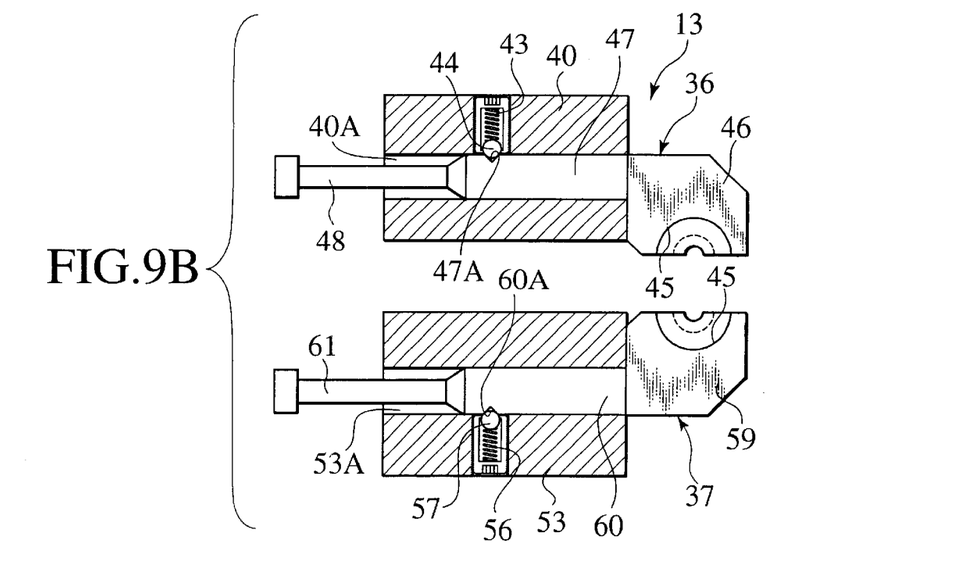
FIG. 9B is a sectional explanatory view showing an assembled state of FIG. 9A.

Now the structure of the upper rubber plug holder 36 to be fitted into the slot 40A of the upper fixed block 40 will be described. The upper rubber plug holder 36 consists of a rubber plug holding block 46 having a rubber plug accommodating recess 45 at its bottom surface for accommodating the upper half of the rubber plug 14 (divided along the plane passing through the axis of rotation of the rubber plug 14), a fixed arm 47 integrally formed at a side of the rubber plug holding block 46 and an operatively pushed part 48 integrally formed at an end of the fixed arm 47. The fixed arm 47 and the operatively pushed part 48 are integrally formed so as to extend generally in line with their total length set to be longer than the length of the slot 40A. The fixed arm 47 has a V-shaped groove 47A at a prescribed position to which the ball 44 is engaged. In fitting the upper rubber plug holder 36 into the upper fixed block 40, it is only required, as shown in FIG. 9B, to fit the operatively pushed part 48 and the fixed arm 47 into the slot 40A to engage the ball 44 with the V-shaped groove 47A formed in the fixed arm 47. At that time, the operatively pushed part 48 is protruded from the side opposite to the insertion side of the slot 40A. Accordingly, pushing the head of the operatively pushed part 48 easily detaches the upper rubber plug holder 36.

As shown in FIG. 7, the upper insertion guide 38 has an insertion guide block 50 at which provided in a protruding manner is an insertion protrusion 49 in a sectionally arc shape, having a groove 49A on its bottom surface for securing a wire insertion path when inserted in the tubular hole of the rubber plug 14, a fixed arm 51 integrally formed at a side of the insertion guide block 50 and an operatively pushed part 52 integrally formed at an end of the fixed arm 51. The fixed arm 51 has a V-shaped groove 51A at a prescribed position like the upper rubber plug holder 36. In fitting the upper insertion guide 38 into the slot 41A of the upper movable block 41, a ball not shown is engaged with the V-shaped groove 51A. The operatively pushed part 52 is protruded from the side opposite to the insertion side of the slot 41A. In the case of changing the upper insertion guide 38, pushing the operatively pushed part 52 easily detaches the guide 38. The upper holder supporting block 34 is configured to allow the movement of the operatively pushed part 52 and to make the operatively pushed part 52 exposed to be pushed easily.

The lower holder supporting block 35 has the same structure as that of the upper holder supporting block 34. That is, the lower holder supporting block 35 has, as shown in FIG. 7, a lower fixed block 53 to which the lower rubber plug holder 37 is attached and a lower movable block 54 positioned closer to the rotary transporter 18 than the lower fixed block 53.

The lower fixed block 53 has a slot 53A penetrating along the apparatus-width direction. The lower movable block 54 also has a slot 54A penetrating in the same direction. The lower movable block 54 is arranged to reciprocatingly movable by sliding on guide rods 55, 55 laid across the opposed surfaces of the lower fixed block 53 and the lower holder supporting block 35. The lower movable block 54 is configured to be driven to reciprocatingly move along the guide rods 55, 55 by a drive means not shown in a prescribed timing.

As shown in FIG. 9A, the slot 53A has an internal wall in which provided is a ball biased by a coil spring 56 to be protruded but not pushed out into the slot 53A, which arrangement constitutes a ball plunger. Such a ball plunger is, not shown in the figure, is also provided in a slot 54A of the lower movable block 54.

The lower rubber plug holder 37 to be fitted into the slot 53A of the lower fixed block 53 consists of a rubber plug holding block 59 having a rubber plug accommodating recess 58 at its top surface for accommodating the lower half of the rubber plug 14, a fixed arm 60 integrally formed at a side of the rubber plug holding block 59 and an operatively pushed part 61 integrally formed at an end of the fixed arm 60. The fixed arm 60 and the operatively pushed part 61 are integrally formed so as to extend generally in line with their total length set to be longer than the length of the slot 53A. The fixed arm 60 has a V-shaped groove 60A at a prescribed position to which the ball 57 is engaged. In fitting the lower rubber plug holder 37 into the lower fixed block 63, it is only required, as shown in FIG. 9B, to fit the operatively pushed part 61 and the fixed arm 60 into the slot 53A to engage the ball 57 with the V-shaped groove 60A formed in the fixed arm 60. At that time, the operatively pushed part 61 is protruded from the side opposite to the insertion side of the slot 53A. Accordingly, pushing the head of the operatively pushed part 61 easily detaches the lower rubber plug holder 37.

As shown in FIG. 7, the lower insertion guide 39 has a insertion guide block 63 at which provided in a protruding manner is an insertion protrusion 62 in a sectionally arc shape, having a groove 62A on its top surface for securing a wire insertion path when inserted in the tubular hole of the rubber plug 14, a fixed arm 64 integrally formed at a side of the insertion guide block 63 and an operatively pushed part 65 integrally formed at an end of the fixed arm 64. The fixed arm 64 has a V-shaped groove 64A at a prescribed position like the lower rubber plug holder 37. In fitting the lower insertion guide 39 into the slot 54A of the lower movable block 54, a ball not shown is engaged with the V-shaped groove 64A. The operatively pushed part 65 is protruded from the side opposite to the insertion side of the slot 54A. In the case of changing the lower insertion guide 39, pushing the operatively pushed part 65 easily detaches the guide 39. The lower holder supporting block 35 is configured to allow the movement of the operatively pushed part 65 and to make the operatively pushed part 65 exposed to be pushed easily.

The upper holder supporting block 34 and the lower holder supporting block 35 are driven with a drive means not shown to be movable both in the direction of attaching/detaching to/from each other and in the longitudinal direction of the apparatus. The upper and lower movable blocks 41 and 54 are driven with a drive means not shown to move close to and apart from the upper and lower fixed blocks 40 and 53.

Figure 8:
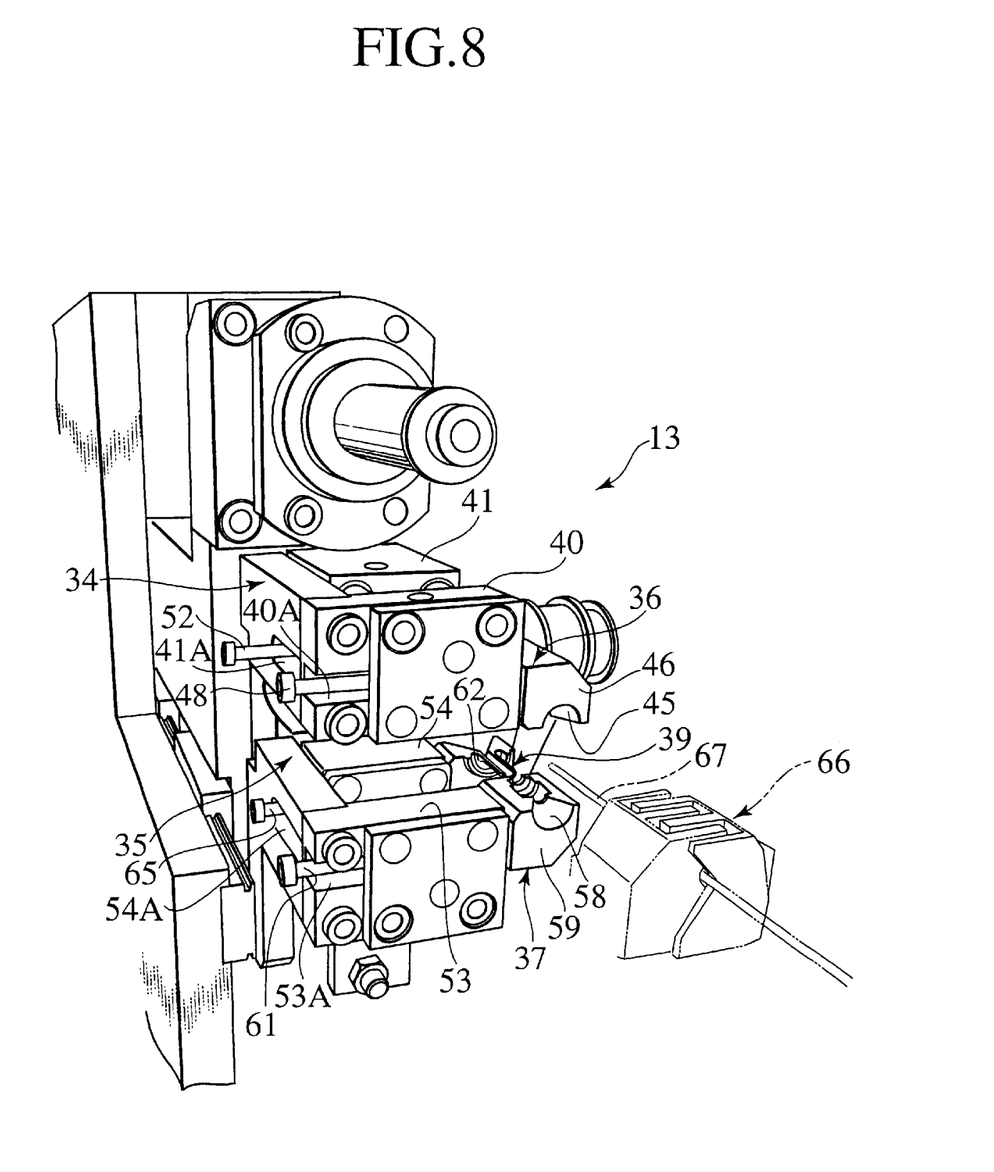
FIG. 8 is an exploded perspective view of the rubber plug fitting section in this embodiment taken from a different angle from that of FIG. 7.

At the rear of the rubber plug fitting section 13 (the opposite side to the rotary transporter 18), a wire end holder 66 is disposed as shown in FIGS. 3, 4 and 8. The wire end holder 66 is supplied each time with a wire end 67 to be disposed thereon, over which end 67 the rubber plug 14 is fitted, as shown in the figures.

The rubber plug fitting apparatus 10 in this embodiment has been described in structure, and now will be described in function/operation.

The rotation and the vibration of the drum 15 in the rubber plug supply section 11 causes the rubber plugs 14 in the drum 15 aligned on the feeder 16 to be fed. The rubber plug 14 moved along the feeder to reach the rubber plug holder 22 in the rubber plug pusher 17 (See FIG. 6A) is pushed up by the escape pin 21 in a prescribed timing. At that time, the transporting pin 29 of the rotary transporter 18 awaits above the rubber plug holder 22, so that the pushed-up movement of the rubber plug 14 causes the transporting pin 29 to be inserted in the tubular hole of the rubber plug 14, which is thus held (in a state shown in FIGS. 5A and 5B).

After the rubber plug 14 is held with the transporting pin 29 facing downward, the driving shaft 31 of the drive pulley 32 is rotated to a prescribed rotational angle under a drive signal outputted from a controller not shown. The rotation is transmitted to the rotary block 28 which is then rotated 90 degrees through the endless belt 33 and the transmission pulley 30. This rotational movement brings the transporting pin 29 holding the rubber plug 14 adjacent to the rubber plug fitting section 13.

In this state, the upper and lower holder supporting blocks 34 and 35 spaced apart vertically are moved with a drive means not shown to a position where the upper and lower rubber plug holders 36 and 37 are placed above and below the rubber plug 14 held with the transporting pin 29. Thereafter the upper and lower holder supporting blocks 34 and 35 are moved close to each other to enclose and hold the rubber plug 14 with the rubber plug accommodating recesses 45 and 58 of the upper and lower rubber plug holders 36 and 37. With this state maintained, the upper and lower holder supporting blocks 34 and 35 are moved rearwardly (in the direction to pull the rubber plug 14 out of the transporting pin 29) with a drive means not shown, to separate the rubber plug 14 from the transporting pin 29. Then the upper and lower movable blocks 41 and 54 are moved close to the upper and lower fixed blocks 40 and 53 with a drive means not shown. In this state, the upper and lower insertion guide 38 and 39 are joined and the insertion protrusions 49 and 62 constitute a pipe. With the movement of the upper and lower movable blocks 41 and 54, the insertion protrusions 49 and 62 in a pipe is inserted into the tubular hole of the rubber plug 14 to secure a wire insertion space.

Then the rubber plug fitting section 13 holding the rubber plug 14 in this manner and the wire end holder 66 are brought closer to each other to insert the wire end 67 into the tubular hole of the rubber plug 14. Thereafter, a known termination process can be performed. After the fitting of the rubber plug 14 over the wire end 67 in this manner, a new wire end 67 is set in the wire end holder 66 to repeat the above process, which provides efficient continuous fitting of the rubber plugs 14.

In the rubber plug fitting apparatus 10 in this embodiment, the above structure makes it easy to attach/detach the upper and lower rubber plug holders 36 and 37 and the upper and lower insertion guides 38 and 39 to/from the upper and lower holder supporting blocks 34 and 35. When the size or kind of the rubber plug 14 is changed, for example, this makes it easy to change the upper and lower rubber plug holders 36 and 37 and the upper and lower insertion guides 38 and 39 to the ones of size suitable for the new rubber plug 14 in a short time. Thus various kinds of rubber plugs can be fitted with the rubber plug fitting apparatus 10 without taking a lot of time for the change of the rubber plugs. Further, the upper and lower rubber plug holders 36 and 37 and the upper and lower insertion guides 38 and 39 can be attached/detached with a single push with the so-called ball plunger mechanism, which eliminates the need for special skill for the attachment/detachment, improving the workability.

The above embodiment is not intended to limit the scope of the invention. Various modifications are possible within the intended purpose of the structure. For example, although the rubber plug supply section 11 has the drum 15 and the feeder 16 in the above embodiment, another rubber plug supply means can be used.

Although the rubber plug 14 is transferred to the rubber plug fitting section 13 with the rotary transporter 18 in the above embodiment, another transfer means can be used.

The entire contents of Japanese Patent Application 2000-089898 (filed on Mar. 28, 2000) is incorporated herein by reference.

Although the invention has been described above by reference to certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A rubber plug fitting apparatus, comprising:
   a rubber plug holder for holding a rubber plug to be fitted over a wire end; and
   a holder supporting block to which the rubber plug holder is detachably attached,
   wherein the rubber plug holder comprises:
      a fixed arm configured to be inserted and fixed into the holder supporting block; and
      an operatively pushed part formed at an end of the fixed arm: and
   wherein the holder supporting block comprises:
      a slot into which the fixed arm is inserted and fitted and from which the operatively pushed part is protruded on the side opposite to the insertion side; and
      a fixing means for fixing the fixed arm inserted and fitted into the slot with the insertion of the fixed arm into the slot, and allowing the fixed arm to be pulled out of the slot at a press of the operatively pushed part.

2. A rubber plug fitting apparatus as set forth in claim 1, wherein the fixing means comprises:
   a ball provided in an internal wall of the slot and arranged to be engaged with the fixed arm inserted and fitted into the slot; and
   a biasing means for biasing the ball to the slot side to engage the ball with the fixed arm inserted and fitted into the slot.

3. A rubber plug fitting apparatus as set forth in claim 2, wherein the fixed arm is provided with a recess with which the ball is engaged.

4. A rubber plug fitting apparatus as set forth in claim 3, wherein the recess is a V-shaped groove.

* * * * *